US008739572B2

(12) United States Patent
Mini (10) Patent No.: US 8,739,572 B2
(45) Date of Patent: Jun. 3, 2014

(54) COMPONENT BASED GLASS CASTING SYSTEM AND METHOD (76) Inventor: Christopher Mini, Eugene, OR (US)

(*) Notice: Subject to any disclaimer, the term of this patent is extended or adjusted under 35 U.S.C. 154(b) by 481 days.

(21) Appl. No.: 12/135,000

(22) Filed: Jun. 6, 2008

(65) Prior Publication Data

US 2009/0301136 A1 Dec. 10, 2009

(51) Int. Cl.
*C03B 19/00* (2006.01)
*C03B 29/00* (2006.01)

(52) U.S. Cl.
CPC ............... *C03B 29/00* (2013.01); *C03B 19/00* (2013.01)
USPC ........................ 65/64; 65/63; 65/66

(58) Field of Classification Search
CPC ................ C03B 29/00; C03B 19/00
USPC ............ 65/24, 66, 107, 122, 169–170, 65/357–361, 374.1–374.15; 264/129–137
See application file for complete search history.

(56) References Cited

U.S. PATENT DOCUMENTS

| | | | | | |
|---|---|---|---|---|---|
| 1,465,724 | A | * | 8/1923 | Barnes | 65/319 |
| 1,494,042 | A | * | 5/1924 | Twyman | 65/357 |
| 2,008,854 | A | * | 7/1935 | Dostal | 249/105 |
| 2,031,739 | A | * | 2/1936 | Hosea | 65/323 |
| 2,924,851 | A | * | 2/1960 | Birckhead, Jr. et al. | 249/141 |
| 2,937,476 | A | * | 5/1960 | Davies | 249/62 |
| 2,994,161 | A | * | 8/1961 | Bair | 65/26 |
| 3,092,247 | A | * | 6/1963 | Woodruff | 206/205 |
| 3,254,981 | A | * | 6/1966 | Havens | 65/359 |
| 3,265,489 | A | * | 8/1966 | Garbin | 65/291 |
| 3,326,270 | A | * | 6/1967 | Sevier et al. | 164/487 |
| 3,429,365 | A | * | 2/1969 | Schrewe | 164/416 |
| 3,483,918 | A | * | 12/1969 | Wognum | 164/416 |
| 3,586,491 | A | * | 6/1971 | Mennitt | 65/265 |
| 3,596,869 | A | * | 8/1971 | Humphrey | 249/155 |
| 3,778,246 | A | * | 12/1973 | Rankl | 65/360 |
| 3,868,242 | A | * | 2/1975 | Witting et al. | 65/360 |
| 3,873,292 | A | * | 3/1975 | Penberthy | 65/68 |
| 3,877,309 | A | * | 4/1975 | Hance | 73/864.57 |
| 4,182,507 | A | * | 1/1980 | Bekey et al. | 249/54 |
| 4,314,775 | A | * | 2/1982 | Johnson | 405/155 |
| 4,404,129 | A | * | 9/1983 | Penberthy et al. | 588/11 |
| 4,530,392 | A | * | 7/1985 | Read | 164/268 |
| 4,759,937 | A | * | 7/1988 | Spector | 426/274 |
| 5,044,921 | A | * | 9/1991 | Micelli et al. | 425/451.9 |
| 5,281,117 | A | * | 1/1994 | Hong | 425/2 |

(Continued)

FOREIGN PATENT DOCUMENTS

SU 764840 * 9/1980 ............ B22D 7/10

OTHER PUBLICATIONS

Livshits et al. SU 764840 B foreign patent document image as provided by EAST on Jan. 14, 2010.*

(Continued)

*Primary Examiner* — Jodi C Franklin
(74) *Attorney, Agent, or Firm* — Forrest Law Office, P.C.

(57) ABSTRACT

A system and method for providing component based glass casting are disclosed. One embodiment comprises arranging at least one metal shape to define boundaries of a casting dam, lining the boundaries with ceramic fiber paper to create a containment including the at least one metal shape and the ceramic fiber paper, inserting glass in the containment, and firing the glass and the containment in a kiln to cast a glass shape corresponding to a portion of the containment.

8 Claims, 6 Drawing Sheets

(56) References Cited

U.S. PATENT DOCUMENTS

| | | | |
|---|---|---|---|
| 5,330,343 A * | 7/1994 | Berteau | 425/175 |
| 5,896,912 A * | 4/1999 | Monroe et al. | 164/134 |
| 5,921,012 A * | 7/1999 | Caivano | 40/541 |
| 6,279,346 B1 * | 8/2001 | Ribes et al. | 65/25.4 |
| 6,332,769 B1 * | 12/2001 | Bashor et al. | 425/388 |
| 2005/0076516 A1 * | 4/2005 | Groll et al. | 30/315 |
| 2005/0132579 A1 * | 6/2005 | Sartori | 30/299 |
| 2006/0006582 A1 * | 1/2006 | Strelnieks | 264/330 |

OTHER PUBLICATIONS

Livshits et al. SU 764840 B translation of Abstractas provided by EAST on Jan. 14, 2010.*

Slumpys as found at http://web.archive.org/web/20080306220236/http://www.slumpys.com/SlumpysStore/productlist_Stainless_Molds_666VGH666.aspx. On Aug. 7, 2013.*

WarmGlass, "Pattern Bars" as viewed at http://www.warmglass.com/pattern_bars.htm on Aug. 8, 2013 herein after referred to as WarmGlass.*

Skutt, "Fusing Glass 101" as viewed at http://www.skutt.com/glass/resources/glass_fusing101.php on Aug. 8, 2013 herein after referred to as Skutt.*

Firelite Forms "All Stainless" as viewed at, http://www.fireliteforms.com/category/39260151 on Aug. 8, 2013.*

* cited by examiner

COMPONENT BASED GLASS CASTING SYSTEM AND METHOD

BACKGROUND

A glass casting process produces glass objects by melting glass in a mold of a desired shape, allowing the glass to cool in the mold until it is sufficiently hard, and then separating the glass from the mold. There are various techniques for creating molds for glass objects, each technique with its own advantages.

Rectangles may be cast by creating containments using firebrick or ceramic. For example, kiln shelves may be cut in long strips which may be arranged as a rectangle mold. In some instances, the containments may be lined with fiber paper or other refractory. One drawback of creating containments out of firebrick or ceramic is a limited number of shaping options. In another example, a vermiculite board may be used for making straight sided casting boxes. However, vermiculite may be quite fragile and hard to create complex shaped containments, especially after the vermiculite undergoes a burnout process where a containment is fired before use to remove the binders.

In another example containment, fiber-lined rings may be used to cast glass. For example, a cut section of pipe may be used to create a containment. Unfortunately, pipes come in a limited range of sizes and many pipes have sidewalls that are too thick to allow their shape to be easily changed. Pipes may be made out of material that does not expand and contract in a linear fashion during firing, for example a carbon steel pipe, and therefore may be problematic for glass casting processes. Additionally, many pipe materials have limited durability, may corrode rapidly at a high temperature and therefore may require cutting multiple sections of pipe.

Existing glass casting approaches often utilize metal casting techniques such as sand casting, lost wax, etc. In a sand casting example, a positive model is made, for example from wood stock. Then, the positive model is pressed into a prepared sand bed, making an impression that is then filled with glass or metal. In some instances, a three-dimensional casting may be created by placing a top mold inverted above a bottom mold. There are two main variants (green sand, and sodium silicate).

In a green sand approach, sand is mixed with a binder to hold the sand in a particular shape. For example, in a metal casting sand may be mixed with motor oil. Casting is usually done with molten glass from a furnace, with carbon black used as a mold release. However, using this approach in a kiln is inefficient as the sand is also heated. Furthermore, since using this approach in a kiln requires more heat, it may take a relatively long time and also may result in overcooking the glass that is being cast. Additionally, a sand based approach may overcook glass that is being cast, causing an unintended color shift in the glass and potentially causing incompatibilities between different portions of a casting.

Additionally, sodium silicate may be mixed with sand & packed around a model, wherein the sand is then flooded with carbon dioxide causing the sand to lock together into a rigid mold. This approach can provide fine detail when used with sand of a particular grain size and within a certain sand to binder ratio. Unfortunately, this approach typically requires creating a new mold for each casting process.

Lost wax is another traditional casting method. In this approach, a wax model may be made and surrounded with a castable refractory. When the refractory is dry, the mold may then be heated to remove the wax, and molten glass is introduced through channels called sprues to fill the voids. While this approach may be automated, it also requires creating a new mold for each new casting process.

In a plaster investment casting approach, a plaster/silica mix or castable refractory may be used. This approach involves suspending a model shape in a container and pouring the castable refractory in around the model shape. Once the castable refractory sets-up and dries, the model may be burned out to create a ready to use mold. A plaster investment casting approach also may generate uneven cooling of a glass casting, which may cause the casting to fail or cause an unintended change in geometry or may result in uneven quality of the glass casting.

In a dip and sprinkle casting approach, a wax model is dipped in a binder solution and sprinkled with refractory grit. The model is then repeatedly dipped and sprinkled with successively coarser grits until a shell is built up around the model. After the model is removed, glass may be placed into the mold created by the shell. In this approach, after casting the mold may then be removed by sandblasting or other destructive method. A variant of this may be used for art glass where a plaster mix is first combined with loose refractory fiber, then hand-packed onto a model in layers.

The approaches described above are traditional metal casting methods that may be used in a glass casting process. These methods typically require a separate process for making a model, which is then used to make a mold. Further, some part of each of these approaches is destroyed in the process. Additionally, some of these traditional metal casting methods use a significant amount of refractory, which requires more energy to be heated to a casting temperature and also acts as an insulator to impede heating of the cast material. The following paragraphs describe approaches specifically developed for glass casting.

In a cut fiber investment glass casting approach, multiple designs are cut into sheets of fiber paper, and the sheets of fiber paper are then stacked to achieve a three dimensional shape. For example, a cut fiber investment technique is sometimes used for open-faced castings. Although this approach allows a range of casting shapes, the shapes must be cut into multiple sheets of paper, thus resulting in a laborious process. Further, as fiber paper is relatively expensive and a cut fiber investment approach relatively labor intensive, this approach may be cost prohibitive.

Another approach specifically designed for glass casting is a rigidized fiber mold approach. In this approach refractory fiber paper, or a blanket or a board, is soaked with a rigidizing agent such as sodium silicate, and then shaped over a form. After the fiber paper, blanket or board dries, it is rigid enough to be used as a mold or a slumping form.

In a Pate de Verre casting approach, a plaster mold may be cast around a model, for example a clay or wax model, then the model is removed. Next, glass frit or powder is mixed with a binder and packed in the mold and then fired one or more times. Unfortunately, in this approach the mold is typically only able to produce one piece.

In a freeze and fuse glass casting approach, glass frit and water is made into a paste, packed into a flexible mold, and then frozen. Next, the frozen paste is placed in a kiln and the glass is heated up to tack the pieces together, sometimes called a tack fuse.

These approaches may require creating molds for every glass casting and consuming essential materials during the process. Further, these approaches may be costly and may provide an inefficient use of materials, energy, time, and labor.

SUMMARY

Accordingly, various embodiments provide a system or method for component based glass casting as described below in the Detailed Description. For example, one embodiment comprises a method for arranging at least one metal shape to define boundaries of a casting dam, lining the boundaries with ceramic fiber paper to create a containment, inserting glass in the containment, and firing the glass and the containment in a kiln to cast a glass shape corresponding to a portion of the containment. Another embodiment comprises a reusable component based glass casting system with metal shapes having a first geometry, other metal shapes having a second geometry, ceramic fiber to line the metal shapes, and a fastener to couple the ceramic fiber with the metal shapes to create a containment to hold glass in a glass casting process.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Generally, this detailed description describes a reusable component based glass casting system and method. The following description provides example embodiments to illustrate a system and method to provide these and other advantages, but these examples are not intended to limit the invention as described in the appended claims, and their equivalents.

In one example embodiment, a component based glass casting system comprises at least one reusable basic shape of light-gauge stainless steel, flexible refractory to create a containment, and glue and/or fasteners to fasten the components together. Basic shapes can be combined to define a complex shape, and during a casting process, the complex shape retains a defined shape of a containment created by the flexible refractory by resisting hydrostatic pressure of molten glass within the containment.

The use of pre-made basic shapes allows relatively quick design changes and requires less skill or experience to achieve a desired design. For example, the use of pre-made basic shapes may decrease setup times for individual castings or for repeated production. Additionally, the effective use of containment materials allows more castings to be made in a specific kiln space. Additionally, the materials used in this approach consume less energy due to lower thermal mass than many conventional molds, therefore increasing efficiency during casting by reducing kiln heating and cooling times. These and other embodiments will be described in more detail below with reference to the accompanying figures.

FIGS. 1A through 5 illustrate example basic shapes that may be used in a component based glass casting system. These example basic shapes are intended as non-limiting examples, and other suitable shapes may be used according to the principles of this detailed description and the appended claims. Other example shapes may include multiple angles, curves, contours, holes, irregular shapes, interlocking parts, surface textures, compound shapes, etc., may be used according to the principles of this disclosure.

Figure 1A:
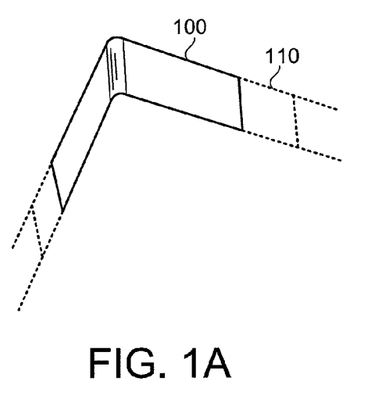
FIG. 1A shows an off-axis diagram of a right-angle component of an embodiment glass casting system.
Figure 1B:
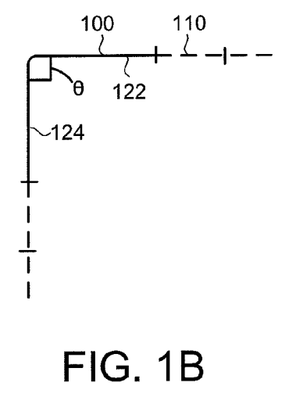
FIG. 1B shows a plan view the right-angle component of an embodiment glass casting system illustrated in FIG. 1A.

FIGS. 1A-1B show an off-axis diagram and a plan view of a basic shape 100 having a right-angle defining the interior angle of a first section 122 of basic shape 100 and a second section 124 of basic shape 100. Some embodiments may comprise different sized right-angle shapes, as illustrated with right-angle shapes 100, 110, and other sizes as illustrated by the dotted lines extending the shape. Furthermore, the shapes may also vary in height, in thickness, etc., thus allowing three-dimensional glass castings, glass castings of complex geometries, etc.

The basic shapes in FIGS. 1A-5, and other basic shapes, may be made of stainless steel. Stainless steel is corrosion resistant, is more distortion resistant during firing, and is stronger at high temperatures than other metals that may be used. Additionally, the use of light gauge metal allows the basic shapes to be customized by bending, flexing, etc. The flexible light gauge metal also may provide a safety factor during a casting process by accommodating unequal contractions of glass and the metal containment due to temperature changes. For example, the light gauge metal may stretch and thereby reduce catastrophic failures of the containment or of glass within it. In a non-limiting example, the basic shapes may be austenitic stainless steel. In other embodiments, the basic shapes may be other metals or materials.

Figure 2A:
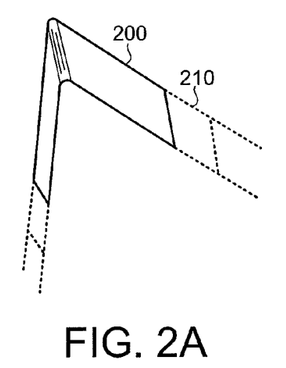
FIG. 2A shows an off-axis diagram of an acute angle component of an embodiment glass casting system.
Figure 2B:
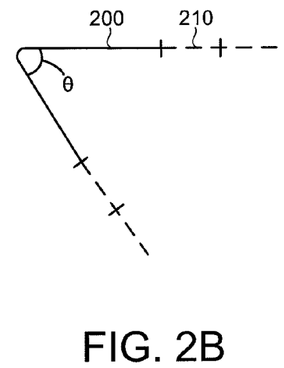
FIG. 2B shows a plan view the acute angle component illustrated in FIG. 2A.

FIGS. 2A-2B show an off-axis diagram and a plan view of an acute angle basic shape 200. In one example, an acute angle basic shape 200 has an interior angle $\Theta$ of 60 degrees, but other embodiments are not so limited. Some embodiments may comprise different sized acute-angle shapes, as illustrated with acute-angle shapes 200, 210, and other sizes as illustrated by the dotted lines extending the shape. Furthermore, the shapes may also vary in height, in thickness, etc., thus allowing three-dimensional glass castings, glass castings of complex geometries, etc.

Figure 3A:
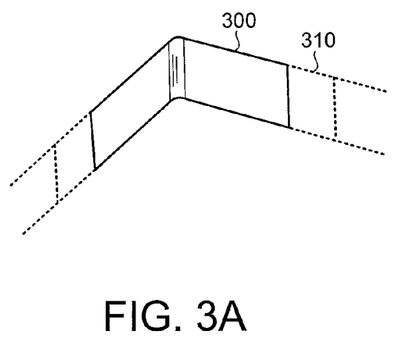
FIG. 3A shows an off-axis diagram of an obtuse angle component of an embodiment glass casting system.
Figure 3B:
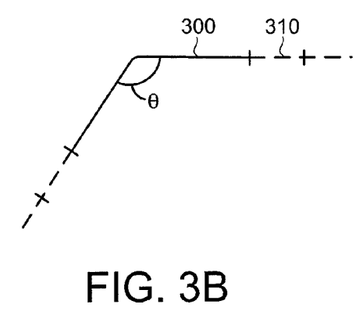
FIG. 3B shows a plan view the obtuse angle component illustrated in FIG. 3A.

FIGS. 3A-3B show an off-axis diagram and a plan view of an obtuse angle basic shape 300. In one example, an obtuse angle basic shape 300 has an interior angle Θ of 120 degrees, but other embodiments are not so limited. In some embodiments, obtuse angle basic shape 300 and acute angle basic shape 200 may have a predetermined sum of their interior angles. For example, the sum of the interior angles may be a convenient sum of angles to create many other complex shapes, such as a sum of 180 degrees. Other embodiments may have one or more different sums of interior angles for basic shapes 200 and 300.

Some embodiments may comprise different sized obtuse angle shapes, as illustrated with obtuse angle shapes 300, 310, and other sizes as illustrated by the dotted lines extending the shape. Furthermore, the shapes may also vary in height, in thickness, etc., thus allowing three-dimensional glass castings, glass castings of complex geometries, etc.

Figure 4A:
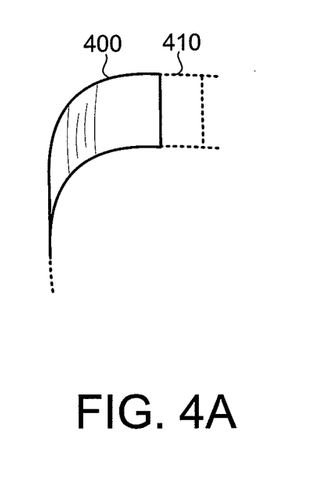
FIG. 4A shows a plan view of a curved shape component of an embodiment glass casting system.
Figure 4B:
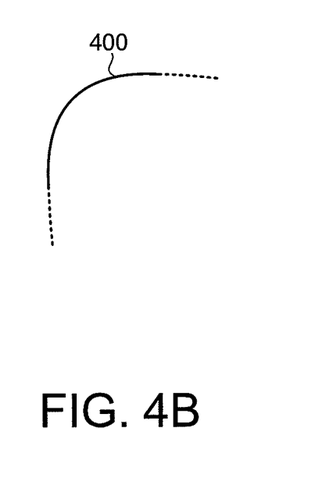
FIG. 4B shows a plan view the curved shape component illustrated in FIG. 4A.

FIG. 4A show an off-axis diagram and a plan view of an example curved shape 400 that may be used in an embodiment glass casting system. Similar to the basic shapes described in reference to FIGS. 1A-3B, some embodiments may comprise different sized curved shapes, as illustrated with curved shapes 400, 410, and other sizes as illustrated by the dotted lines extending the shape. Additionally, the shapes may also vary in height, in thickness, etc., thus allowing three-dimensional glass castings, glass castings of complex geometries, etc.

Figure 5:
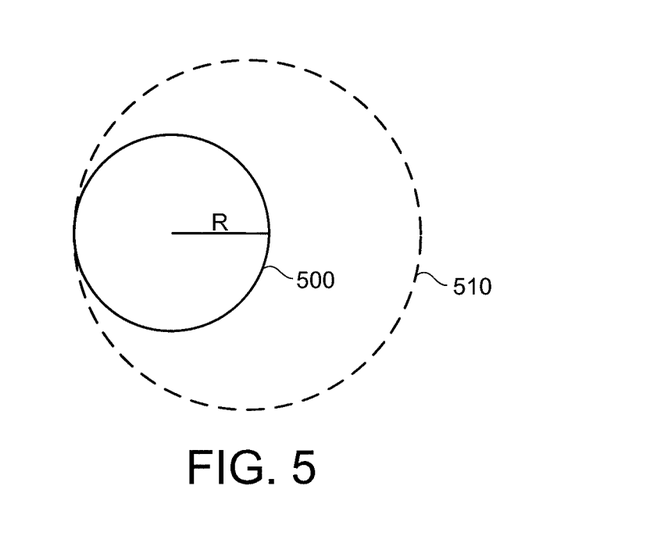
FIG. 5 shows a plan view of a circle component of an embodiment glass casting system.

FIG. 5 shows a plan view of a first circle component 500 and a second circle component 510 that may be used in an embodiment glass casting system. Other components may include other circles with different radii R, may include enclosed shapes of other geometries, such as triangles, squares, hexagons, other polygons, irregular shapes, etc. We now turn to FIGS. 6A-6E to illustrate a glass casting system including a complex shape comprised of multiple component shapes.

Figure 6A:
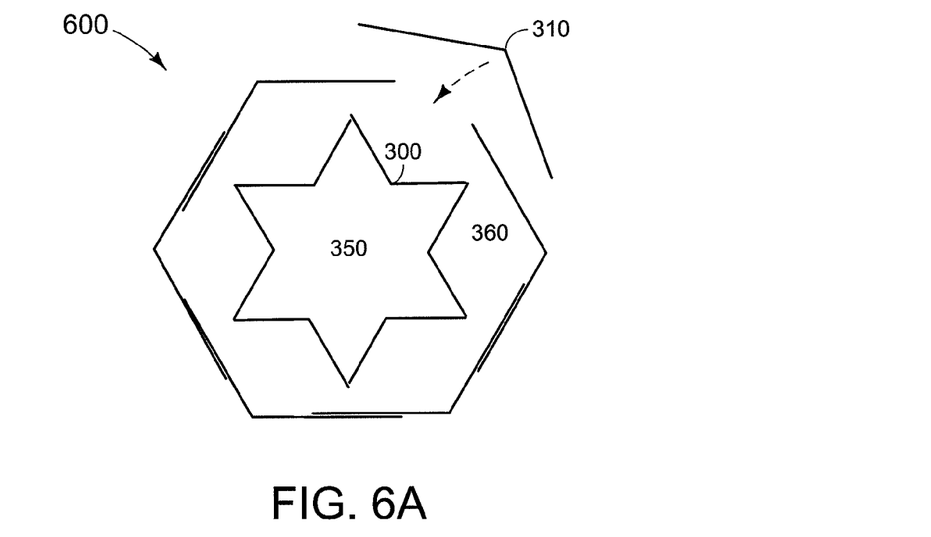
FIG. 6A illustrates a plan view of a complex shape including an inclusive mold and an exclusive mold using multiple components of an embodiment glass casting system.

FIG. 6A illustrates a plan view of an embodiment system 600 including a space 360 defined by an inclusive mold and a void 350 defined by an exclusive mold in a reusable component based glass casting system. System 600 is used to help illustrate a complex geometry that may be created by reusable components, but is not intended as limiting and other shapes may be created using the same components. As illustrated, system 600 comprises a first plurality of metal shapes each having a first geometry, in this case obtuse angle shape 300, and, a second plurality of metal shapes each having a second geometry, in this case obtuse angle shape 310. In some embodiments, a single metal shape may be used as a mold, dam, barrier, or other containment according to the principles of this disclosure.

The first plurality of obtuse angle shapes 300 is arranged in a six-pointed star, wherein the point defining the angle of points toward the center of the star, and the two ends of each shape form the points of the star with ends of other obtuse angle shapes 300. The star is arranged such that there is very little gap between each shape in order to create a structure to support ceramic fiber paper and create a containment for glass to be cast in. The second plurality of obtuse angle shapes 310 is arranged substantially in a hexagon, with the last obtuse angle shape 310 shown being placed to complete the hexagon.

Figure 6B:
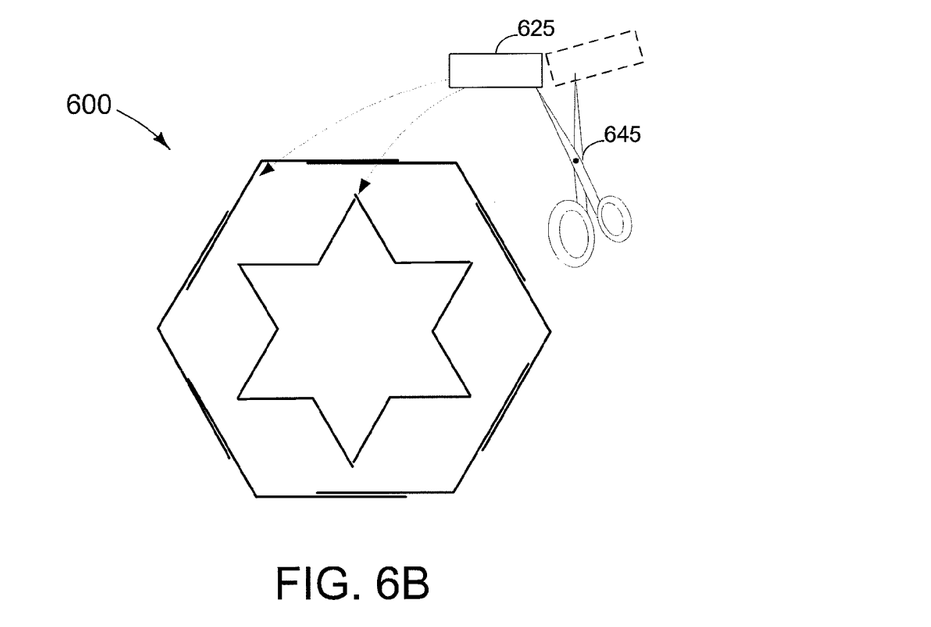
FIG. 6B illustrates plan view of refractory being sized to fit portions of the complex shape from FIG. 6A.

Next, in FIG. 6B, a strip of ceramic fiber paper 625 is sized to fit the sides of any of the basic shapes that will come in contact with glass during casting. In some embodiments, another suitable refractory may be used instead of ceramic fiber paper 625. Additionally, a fastener may be used to couple the ceramic fiber paper 625 with the first plurality of metal shapes and/or with the second plurality of metal shapes to create a containment to hold glass for a glass casting process. For example, a fastener may be a polyvinyl acetate (PVA) glue, or any other suitable fastener. In some embodiments, metal fasteners such as pins, staples, or clips can also be used to join pieces of ceramic fiber paper together, forming a bond that survives a casting process.

Figure 6C:
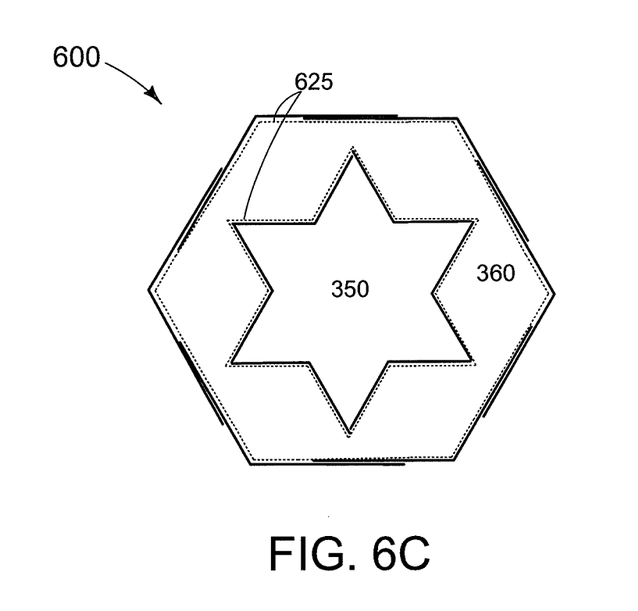
FIG. 6C illustrates plan view of portions of the complex shape from FIG. 6A being lined with cut portions of refractory.

Then, after the ceramic fiber paper 625 is cut, it is used to line a defined shape such as the outside of the six-pointed star or the inside of the hexagon as illustrated in FIG. 6C. In this way, the ceramic fiber paper 625 is used to connect the basic shapes together and form a closed containment to hold the glass while it is molten. Ceramic fiber paper 625 may also provide other advantages in a component based glass casting approach. For example, it may reduce or prevent contact between hot glass and the metal of the basic shape, reducing sticking and contamination of the glass by metal oxides.

Further, the ceramic fiber paper 625 may provide a cushion to reduce damage to closed metal shapes due to differences in the coefficient of thermal expansion between the glass and the metal in the basic shapes. Ceramic fiber paper 625 also enables modification of basic shapes during design and assembly by extending and/or trimming the ceramic fiber paper to a desired shape. Fiber paper can usually be reused a few times.

In some embodiments, ceramic fiber paper is a felt-like refractory made from spun alumina and silica fibers. A commonly used ceramic fiber paper may be rated for use to around 2150 Fahrenheit, and often comes in a variety of thicknesses from very thin up to around ¼ inch.

In some embodiments, a release agent may be used instead of a flexible refractory. Example release agents include clay-based preparations such as kiln wash or shelf preparation, or boron nitride-based coatings, however, other embodiments are not so limited and other suitable release agents may be used as opposed to flexible refractories.

Figure 6D:
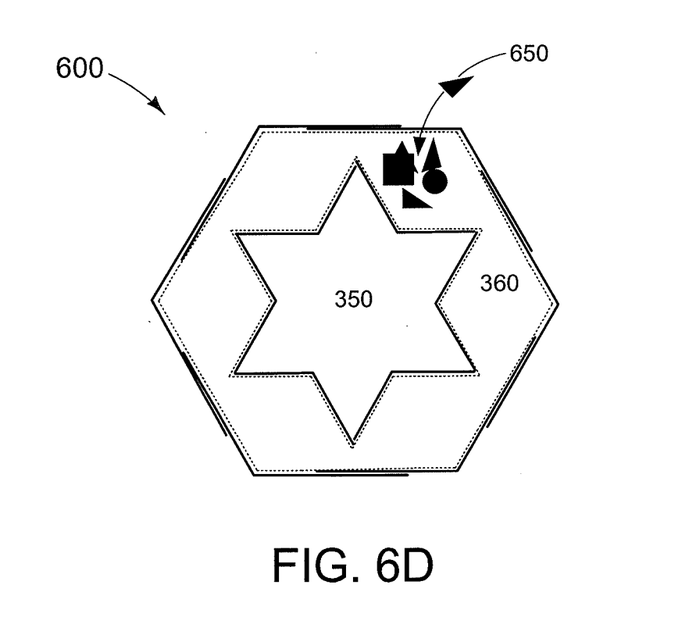
FIG. 6D illustrates glass bits being placed within the refractory lined portions of the complex shape from FIG. 6A.
Figure 6E:
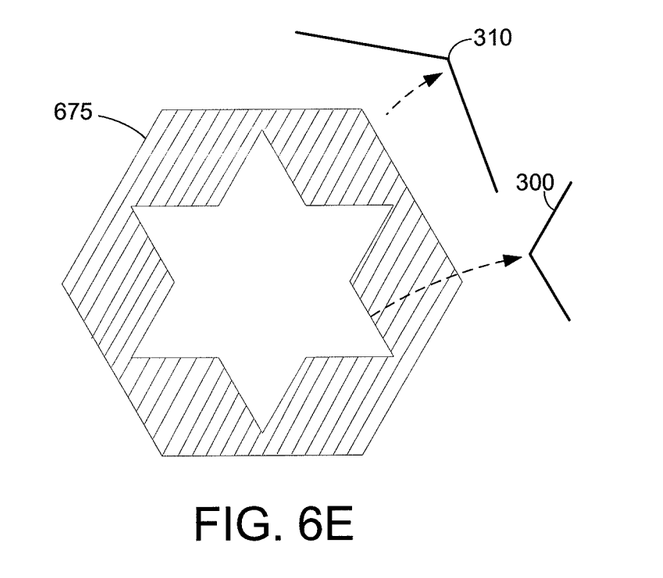
FIG. 6E illustrates a plan view of a glass shape cast from the complex shape from FIG. 6A and the reuse of components of an embodiment glass casting system according to the principles of this disclosure.

FIG. 6D illustrates glass pieces 650 being placed within the refractory lined portions of the complex shape from FIG. 6A. When the system and glass is sufficiently heated, such as in a kiln, the glass pieces melt and/or conform to the shape of the containment, and generate the glass casting 675 illustrated in FIG. 6E. Glass casting 675 has a void in the middle in the shape of the star, and a hexagonal outside geometry. Further, after the glass casting 675 has been sufficiently cooled, the basic shapes 300 and 310, and the ceramic fiber paper may be separated from the casting and later reused in another glass casting process.

Figure 7:
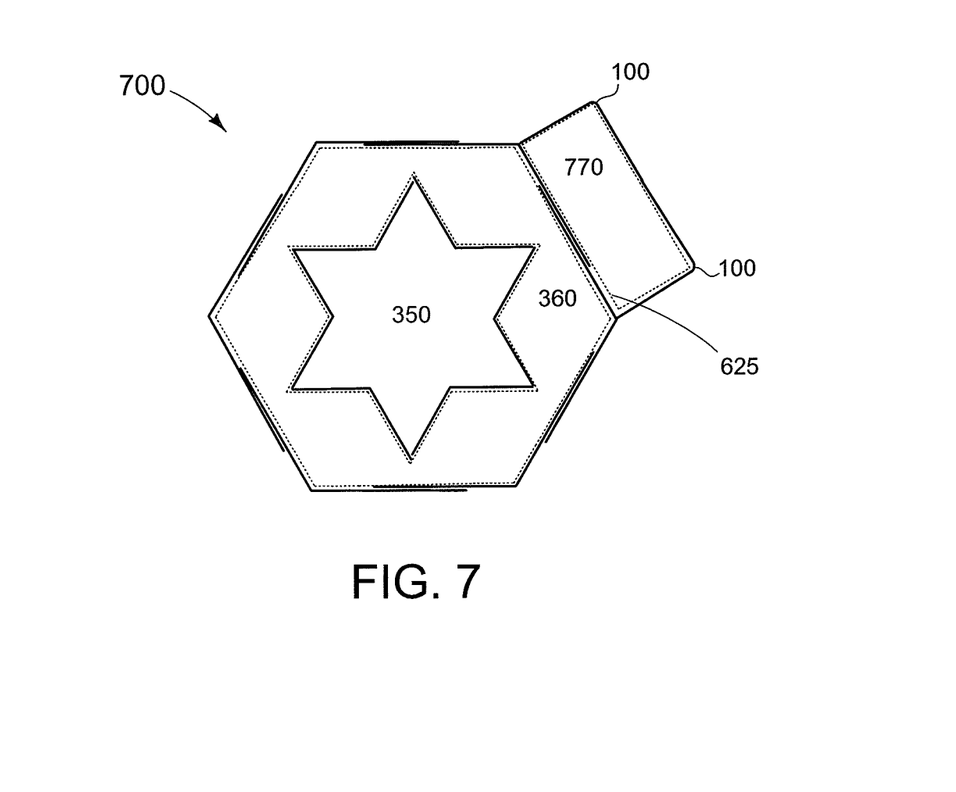
FIG. 7 illustrates a plan view of a combination of complex shapes created with components and utilizing a common wall.

FIG. 7 illustrates a plan view of a combination of complex shapes created with components and utilizing a common wall. For example, the complex shape 600 created as described in reference to FIG. 6 may be efficiently utilized as a portion of an outside dimension for another complex shape 770. In this way, a component based approach can create shapes having a range of geometries while reusing portions of other complex shapes, in turn reducing the amount of materials to be fired in a kiln and therefore using less energy, reducing the time to complete a glass casting process, and using kiln space more effectively. In another common wall example, the glass casting 675 in FIG. 6E may have a separate nested glass casting in the void in the middle of the star.

Figure 8:
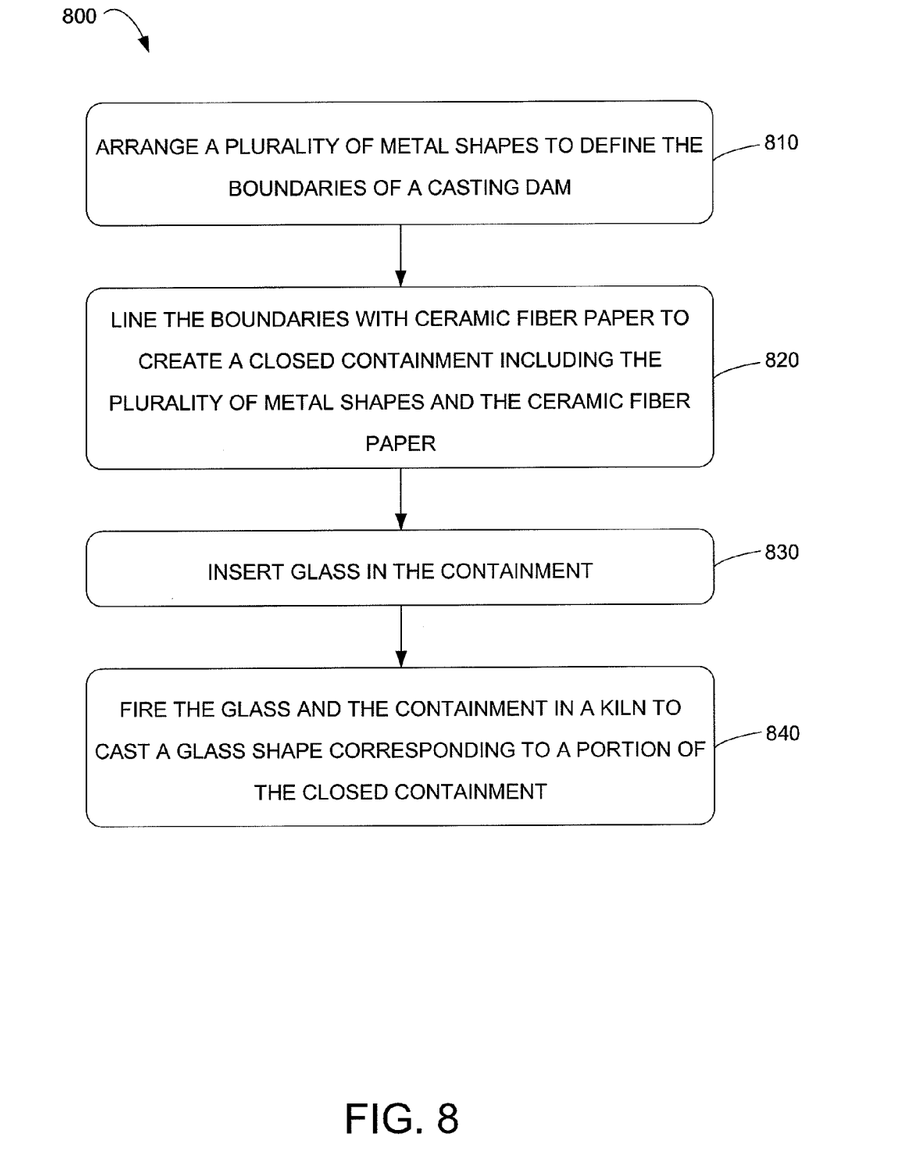
FIG. 8 shows a process flow depicting an embodiment of a method for component based glass casting.

FIG. 8 shows a process flow depicting an embodiment of a method 800 for component based glass casting. In block 810, method 800 comprises arranging at least one metal shape to define boundaries of a casting dam. In some embodiments a single shape may be arranged with other pre-existing shapes to define one or more boundaries of a casting dam. In some embodiments, a single shape may be used to create a casting dam. For example, the metal shape may be light-gauge stainless steel, or another suitable metal, and shapes may include circles, angles, curves, multiple angles, multiple curves, contours, straight sections, plates, irregular shapes, interlocking parts, surface textures, compound shapes, etc. Furthermore, since the casting dam includes at least one component metal shape and ceramic fiber, it may be disassembled and the at least one metal shape and the ceramic fiber may be re-arranged to define a subsequent casting dam and used in multiple casting processes without a lengthy process, and without destroying casting materials, etc.

In some embodiments, a metal shape is a flexible metal shape. Example flexible metal shapes may be made of stainless steel, or other suitable metals that allow a user to plastically deform the shape by hand without the use of tools or without needing to take the shape to a metal worker. Further, by being flexible enough to be manipulated by hand, a metal shape is also economically advantageous and particularly well suited for individual glass artists, small studios, etc.

Next, method 800 comprises lining boundaries of the casting dam with ceramic fiber paper to create a containment created by the at least one metal shape and the ceramic fiber paper, as indicated in block 820. Ceramic fiber paper is used in the present example embodiment, but other embodiments are not so limited. Any refractory sufficient to be shaped to the boundaries of the casting dam may be used, for example, a woven refractory cloth may be used.

Next, method 800 comprises inserting glass in the containment, as indicated at 830. Glass may be placed within the containment in many suitable forms. For example, glass may be a powder; frits of different sizes and/or colors; furnace cullets; molten glass; precut pieces of sheet glass such as strips, geometric shapes, precut pieces that form a design element; previously-cast elements; scrap glass ranging from recycled bottles or window glass to post-manufacturing waste from glass sheet manufacturers, or other types of scrap glass, etc.

In block 840, method 800 comprises heating the glass and the containment to cast a glass shape corresponding to a portion of the containment. For example, the glass and the containment may be fired in a kiln to a sufficient temperature to turn the glass to liquid to cast a glass shape corresponding to a portion of the containment. In some embodiments, glass pieces may be heated enough to bind them together without turning all of the glass to liquid. For example, glass bits may be cast in a porous shape corresponding to a portion of the containment, where the pieces are fused together but the shape is not homogenously solid. In another example, a glass piece may undergo a slumping process by being heated enough to deform the glass piece while not becoming liquid enough to completely settle in the containment, by undergoing a plastic deformation, etc.

Some embodiments may further comprise fastening the ceramic fiber paper to the plurality of shapes to create a more robust containment. In one example, the ceramic fiber paper may be fastened to at least one metal shape or to other pieces of fiber paper, or metal shapes may be affixed to each other, using a polyvinyl acetate glue to hold the containment together. In some embodiments metal fasteners such as pins, staples, wires, or clips may be used to join pieces of ceramic fiber or metal shapes together, making a bond that can survive the casting process. In some embodiments, an assemblage of metal shapes may be fastened together with hot glue that may burn-off during kiln firing. A hot glue approach allows easier application of ceramic fiber and also allows an overall shape to be adjusted without disrupting the continuity of adjacent metal parts.

In an alternate embodiment to method 800, a release agent may be used in place of a flexible refractory. For example, an embodiment component based glass casting method may include arranging a plurality of flexible metal shapes to create a geometry, coating the geometry with a release agent, placing a glass piece on the geometry, placing the glass shape and the geometry in a kiln, and slumping the glass shape to correspond to a portion of the geometry. In a further example embodiment, slumping the glass shape may include draping the glass shape over a convex geometry coated with a release agent.

In some embodiments, the plurality of flexible metal shapes may be rearranged and another glass shape created. For example, an embodiment method may further include disassembling the geometry, arranging the plurality of flexible metal shapes to create a second geometry, coating the second geometry with a release agent, placing a second glass piece on the second geometry, placing the second glass shape and the second geometry in a kiln, and slumping the second glass shape to correspond to a portion of the second geometry.

To continue with the example described with reference to FIG. 6A-E, the plurality of metal shapes may include six shapes each of shape 310 and shape 300. In this way, method 800 involves arranging the six shapes 310 in a perimeter hexagon and the six shapes 300 in a star pattern within the hexagon, as illustrated with system 600. The present example is a combination shape with two casting dams, but other embodiment methods may arrange shapes to create a single casting dam comprising a different shape, a casting dam to create a three dimensional shape, a casting dam with a void, or other combinations of shapes to create one or more casting dams. For example, some embodiments may comprise creating a concave containment using one or more plates and a plurality of metal shapes. Glass can then be inserted in the concave containment, and fired in a kiln to cast a three-dimensional glass shape. Some embodiments may comprise a convex shape, to be used as an exclusionary dam, as a draping form, etc. In some embodiments, the containment may be configured to hold glass as an inclusive dam, as an exclusive dam to create a void in the glass shape, or as a combination of both types of dams.

In a bowl blank example embodiment, a bowl blank may be made using a circular metal shape 500 as inclusive dam. First, a circular metal shape 500 of a desired size is selected and placed on a flat surface. For example, the circular metal shape 500 may be placed on the surface on which it will sit in a kiln, such as a kiln shelf. Then, a strip of ceramic fiber paper 625 may be curled around the inside edge of the circular metal shape 500, touching the inside surface all the way around the circular metal shape 500. Next, the strip of ceramic fiber paper 625 is cut slightly larger than the inside of the circular metal shape 500 and tucked against the metal to create a joint with enough compression to push the fiber in place against the inner surface of the circle. In some cases the fiber may be glued in place, for example if reusing fiber.

In some cases, this process may be repeated to add additional layers of fiber to change a casting shape or size. Then, glass may be placed inside the circular metal shape 500, fired, and annealed using a firing profile appropriate to the casting size, thickness, etc.

In a void example embodiment, a void may be made in a casting using a circular metal shape 500 as an exclusive dam. For example, a circular metal shape 500 of a desired size may first be selected. Then, ceramic fiber paper 625 can be curled around the outside edge of the circular metal shape 500 in contact with the circumference of the circular metal shape 500.

Next, the ceramic fiber paper 625 is cut to fit the outside of the circular metal shape 500 so that no gap exists where glass can touch the circular metal shape 500 during casting, and then the fiber is glued in place. Next, a spring clip or other fastening method may be used to clip one end of the ceramic fiber paper 625 to the outside edge of the circular metal shape 500, and the ceramic fiber paper 625 may be stretched around the metal shape until the ends of the ceramic fiber paper 625 meet, then the remaining end of the ceramic fiber paper 625 may be clipped into place. The circular metal shape 500 may then be placed on a flat surface and the ceramic fiber paper 625 pushed down until the metal surface is covered. In some cases, additional clips or other temporary fastening method may be used to secure the fiber in place. After the glue sets, the clips may be removed.

The circular metal shape and fiber may be placed within a larger containment. Glass may then be placed between the two containments, and the piece fired and annealed using a firing profile appropriate to the size, thickness, etc., of the glass casting.

It will further be understood that the configurations and/or approaches described herein are exemplary in nature, and that these specific embodiments or examples are not to be considered in a limiting sense, because numerous variations are possible. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A reconfigurable component based glass casting system with multiple basic shapes for use in construction of a containment with multiple possible complex shapes, the component based glass casting system comprising:
    a first plurality of metal shapes, each of the first plurality of metal shapes having a first geometry having a straight first section and a straight second section, wherein the first section is connected to the second section at a first angle;
    a second plurality of metal shapes, each of the second plurality of metal shapes having a second geometry having a straight first section and a straight second section, wherein the first section is connected to the second section at a second angle that is different than the first angle of the first plurality of metal shapes;
    ceramic fiber paper to line the metal shapes; and
    a fastener to couple the ceramic fiber paper with the first plurality of metal shapes and with the second plurality of metal shapes to create a containment to hold glass for a glass casting process, wherein the containment is the ceramic fiber paper and the first plurality of metal shapes and the second plurality of metal shapes combine to create a reconfigurable casting dam to shape the containment, wherein any one of the first plurality of metal shapes can be reconfigured with any one or more of the first or second plurality of metal shapes to create a different containment than the containment with multiple possible complex shapes.

2. The component based glass casting system of claim 1, wherein the fastener is glue.

3. The component based glass casting system of claim 2, wherein the glue is a polyvinyl acetate glue.

4. The component based glass casting system of claim 1, further comprising glass pieces to fill the containment, wherein the glass pieces conform to the shape of the containment when the glass is sufficiently heated.

5. The component based glass casting system of claim 1, further comprising:
    a plate, wherein the plate, the first plurality of metal shapes, the second plurality of metal shapes, and the ceramic fiber paper are arranged to create a concave containment; and
    glass pieces to fill the concave containment, wherein the glass pieces conform to the shape of the concave containment when the glass is sufficiently heated to create a three-dimensional glass casting.

6. The component based glass casting system of claim 1, wherein the metal shapes are composed of a flexible light-gauge stainless steel.

7. The component based glass casting system of claim 1, wherein the containment is used to hold the glass as an inclusive dam.

8. The component based glass casting system of claim 7, wherein the containment further includes an exclusive dam to create a void in the glass shape.

* * * * *